United States Patent [19]
Radford

[11] 3,836,002
[45] Sept. 17, 1974

[54] FILTER ELEMENTS
[75] Inventor: Colin M. Radford, Sandton, South Africa
[73] Assignee: Filtaflo (Proprietary) Limited
[22] Filed: June 1, 1973
[21] Appl. No.: 366,304

[30] Foreign Application Priority Data
June 26, 1972 South Africa.................. 72/4388

[52] U.S. Cl.................. 210/232, 210/346, 210/486
[51] Int. Cl............................................ B01d 29/04
[58] Field of Search..................... 210/346, 486, 232

[56] References Cited
UNITED STATES PATENTS
| | | | |
|---|---|---|---|
| 1,323,421 | 12/1919 | Sweetland | 210/486 |
| 1,812,725 | 6/1931 | Stanley et al. | 210/486 X |
| 2,207,346 | 7/1970 | Hopper | 210/486 |
| 2,263,853 | 11/1941 | Requa | 210/486 |
| 2,409,705 | 10/1946 | Reinhardt | 210/486 |

Primary Examiner—Frank A. Spear, Jr.
Attorney, Agent, or Firm—Brumbaugh, Graves, Donohue & Raymond

[57] ABSTRACT

A filter element comprising a panel and a surround to the panel, the surround being shaped for support in a supporting frame of a filter assembly. The panel embodies flow paths allowing fluid flow in the general direction of the plane of the panel and communicating with a drainage channel in the surround. The latter further embodies a caulking groove adapted to retain a sheet of filter material so that the latter overlies the panel.

9 Claims, 5 Drawing Figures

PATENTED SEP 17 1974 3,836,002

FILTER ELEMENTS

This invention relates to filter elements and more particularly, but not exclusively, to filter elements for leaf filters.

Leaf filters are made in different forms for different purposes. In mining operations and sugar purification plants, for example, the elements usually comprise heavy frames over which an envelope of filter material is placed and stitched closed. This generally used construction has many disadvantages in that the complete frame must be removed from the filter when replacing the envelope, the latter must be removed and replaced even if only one side is unserviceable and the downtime for repairs can be extensive.

It is an object of the present invention to provide a filter element which is more versatile than those presently in use and which largely avoids the above disadvantages.

According to this invention there is provided a filter element comprising a panel embodying flow paths in the panel allowing fluid flow in the general direction of the plane of the panel, a surround to the panel embodying a drainage channel with which the flow paths communicate and also embodying a caulking groove and a sheet of filter material adapted to be retained by the caulking groove so that the sheet overlies the panel, the surround being shaped to be releasably supported by a supporting frame associated with a filter assembly.

Further features of the invention provide for the flow paths to be provided by channels or corrugations formed in the panel or by virtue of the panel being of a construction permeable to liquid, for the surround to be made from lengths of extruded synthetic resin material, for the panel to have a sheet of filter material on each of two sides thereof and for the filter material to be contained in the caulking groove by means of an elongated flexible member of resilient material.

The invention also provides a supporting frame adapted to receive the panel, the supporting frame having an end thereof detachable to enable engagement and disengagement of the panel with the supporting frame to be effected.

Still further features of the invention provide for a conduit to connect the drainage channel of the surround with a connection trunnion of the filter assembly and for the conduit to be connected to a pipe extending into the drainage channel of the frame.

A preferred example of the invention suitable for use with an auto-filter as used in a sugar refining plant will be described below with reference to the accompanying drawings in which.

Figure 1:
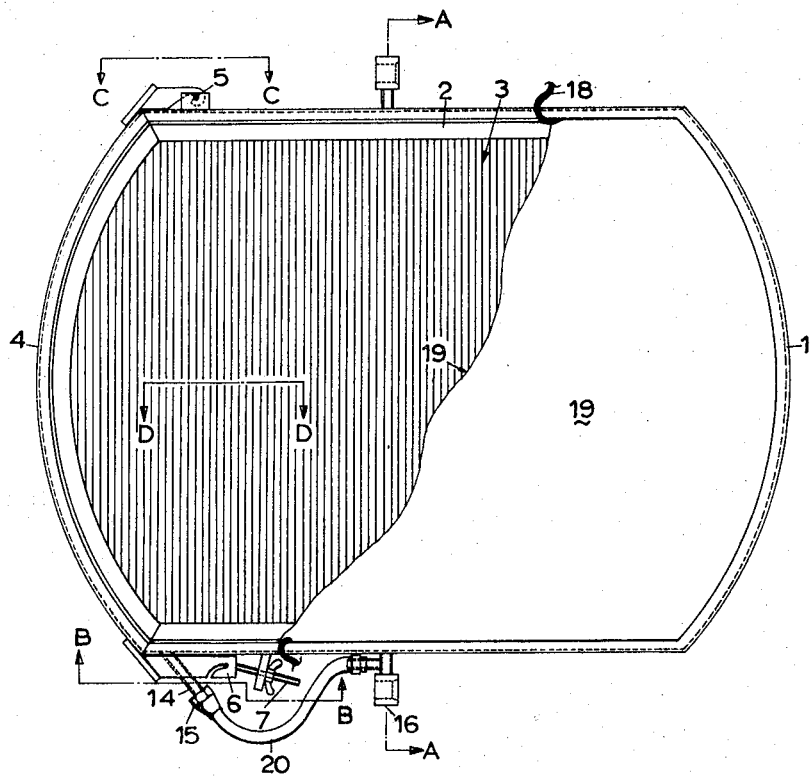
FIG. 1 is a plan view of a filter element constructed according to the invention.

The filter element is carried in a supporting frame 1 and comprises a surround 2 and a panel 3. The supporting frame 1 is preferably made from stainless steel and has one end 4 which is detachable to enable the panel 3 to be removed. In this embodiment of the invention the end 4 is hooked to the frame at 5 and has a bracket 6 adapted to engage a bolt 7 to retain the detachable end 4 in position, but any other suitable clamps or the like may be used.

The frame 1 is preferably of U-shaped cross-section to enable sliding engagement and disengagement of the surround 2 of the panel 3 with the frame 1 to be effected.

The surround 2 is preferably made up of lengths of extruded synthetic resin material such as polypropylene.

Figure 5:
Figure 4:
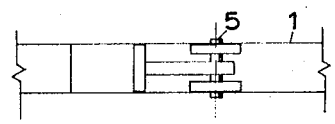

The surround 2 embodies a drainage channel 8 within its entire periphery and encloses the panel 3. The latter may conveniently be retained between flanges 10 of the surround 2. The panel 3 has flow paths communicating with the drainage channel 8. In this embodiment of the invention the flow paths are provided by channels 11 in the panel 3 so that the latter can conveniently be a corrugated sheet of polypropylene as shown in FIG. 5. This material is inert and in fact under most conditions enables the filter medium to be cleaned and rejuvenated in position on the frame 1.

Figure 2:
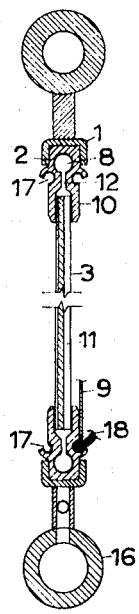
FIG. 2 is a cross-section taken on line A—A in FIG. 1.
Figure 3:
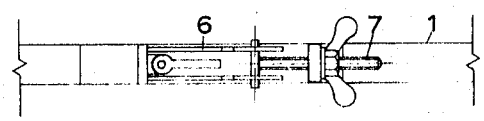
FIGS. 3, 4 and 5 are elevations taken on lines B—B, C—C and D—D respectively in FIG. 1.

As shown in FIG. 2, a passage 12 provides access to the drainage channel 8.

In alternative embodiments of the invention the flow paths referred to may be provided by virtue of the panel 3 being of a construction permeable to liquid, for instance, a fibrous or porous construction.

A pipe 14 extends through the frame 1 into the drainage channel 8. The pipe 14 is adapted to be connected preferably by a quick-release mechanism 15, to a conduit 20 itself connected to a collection trunnion 16 of the frame 1.

A caulking groove 17 is provided along the periphery of the surround 2 on each side thereof and these grooves 17 are each adapted to co-operate with a cord 18 of resilient material to retain a sheet 19 of filter material to overlie the panel 3.

This construction avoids the use of envelopes, enables inexpensive disposable filter media to be effectively used and requires only a damaged sheet to be replaced when necessary.

The panel 3 is easily removed for servicing or replacement of the filter material without having to remove the complete heavy frame as has previously been necessary. Sheet filter material is very much easier to use than envelopes even when rejuvenation of the material is to be effected as allowances can be made around the edges for shrinkage which causes problems where bags or envelopes are used. Also, the downtime of a filter is less than usual when servicing is effected.

Better filtration can consequently be obtained and the assembly is applicable to either pressure or vacuum operated filters.

What I claim as new and desire to secure by Letters Patent is:

1. A filter element comprising a surround having a substantially U-shaped portion and a releasable end portion, the surround having in cross-section a drainage channel adapted to communicate with a panel-receiving groove and having on at least one side of the panel-receiving groove a caulking groove adapted to releasably receive and retain a sheet of filter material; a panel including flow paths which allow fluid to flow in the plane of the panel, the pabel being adapted to be slidably inserted into the panel-receiving groove of the surround so that the flow paths of the panel communicate with the drainage channel of the surround; and at least one sheet of filter material overlying the panel and retained in one of the caulking grooves by a cord sandwiching the sheet into the caulking groove.

2. A filter element as claimed in claim 1 in which the flow paths are provided by channels formed in the panel.

3. A filter element as claimed in claim 1 in which the flow paths are provided by virtue of the panel being of a construction permeable to liquid.

4. A filter element as claimed in claim 1 in which the surround is made from lengths of extruded synthetic resin material.

5. A filter element as claimed in claim 4 in which the surround is adapted to retain a sheet of filter material on each of two sides of the panel.

6. A filter element as claimed in claim 1 in which the cord comprises an elongated flexible member of resilient material.

7. A filter adapted for use with a filter element as claimed in claim 1 including a supporting frame adapted to contain the surround, the supporting frame having an end thereof detachable to enable engagement and disengagement of the surround with the supporting frame to be effected.

8. A filter as claimed in claim 7 including a conduit connecting the drainage channel of the surround with a collection trunnion of the supporting frame.

9. A filter as claimed in claim 8 in which the conduit is connected to a pipe extending into the drainage channel of the surround.

* * * * *